Sept. 25, 1945.    J. R. VICKERY, JR    2,385,744
PAN GREASER
Filed Oct. 15, 1942    6 Sheets-Sheet 1

INVENTOR.
JOHN R. VICKERY, JR.
ATTORNEY.

INVENTOR.
JOHN R. VICKERY JR.
ATTORNEY.

Sept. 25, 1945.   J. R. VICKERY, JR   2,385,744
PAN GREASER
Filed Oct. 15, 1942   6 Sheets-Sheet 6

INVENTOR.
JOHN R. VICKERY JR.
BY George Hastings
ATTORNEY.

Patented Sept. 25, 1945

2,385,744

UNITED STATES PATENT OFFICE 2,385,744

PAN GREASER

John R. Vickery, Jr., Glen Rock, Pa., assignor to American Machine & Foundry Company, a corporation of New Jersey Application October 15, 1942, Serial No. 462,196

15 Claims. (Cl. 91—39)

This invention relates to pan-greasing machines, more particularly to improvements in the mechanism for delivering grease to the brush-heads thereof. Heretofore the delivery of grease to the brush-heads in one type of pan greaser was effected by a pump mechanism which was controlled by the depression of a treadle. However the amount of grease delivered by one depression of the treadle was sufficient to grease several straps of pans, wherefore the greasing of the successive straps of pans was not uniform.

In another type of pan-greaser, the delivery of the grease was controlled by the displacement of a pan rest on which the group of pans to be greased is positioned. The operation of pan-greasers of the latter construction throughout the course of a day was fatiguing; and varying amounts of grease might be delivered to brush-heads, or no grease at all might be delivered, as the amount of grease delivered depended upon the displacement of the pan rest.

It is an object of the invention to provide mechanism which is normally out of operation and will operate automatically when tripped, to deliver a predetermined amount of grease to the brush-heads. Still another object is to adjust said mechanism to vary the amount of grease delivered to the brush-heads. With these and other objects not specifically mentioned in view, the invention consists in certain constructions and combinations hereinafter fully described.

In the accompanying drawings which form a part of this specification:

Figure 1:
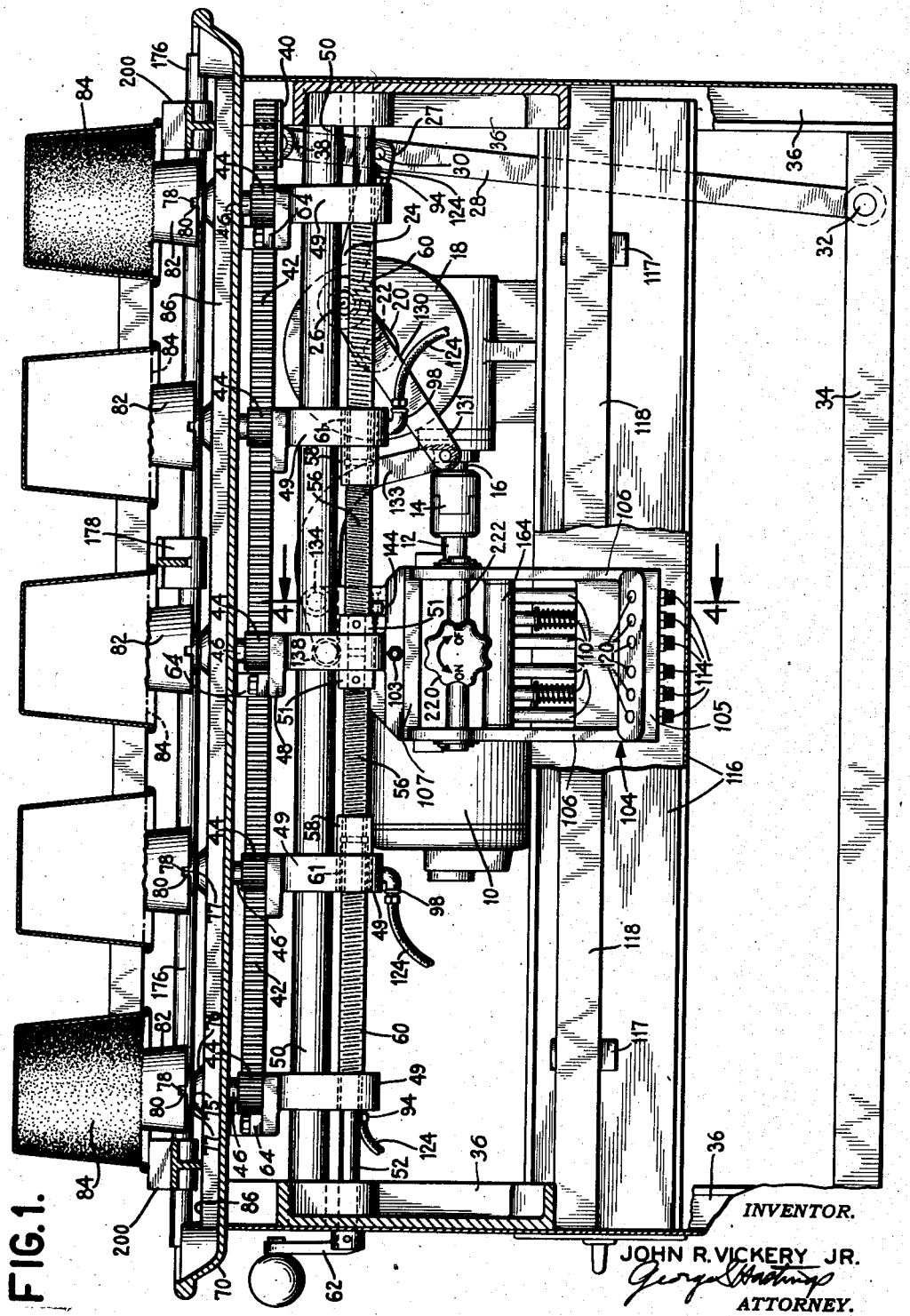
Fig. 1 is a sectional side elevation of the improved pan greasing machine.
Figure 2:
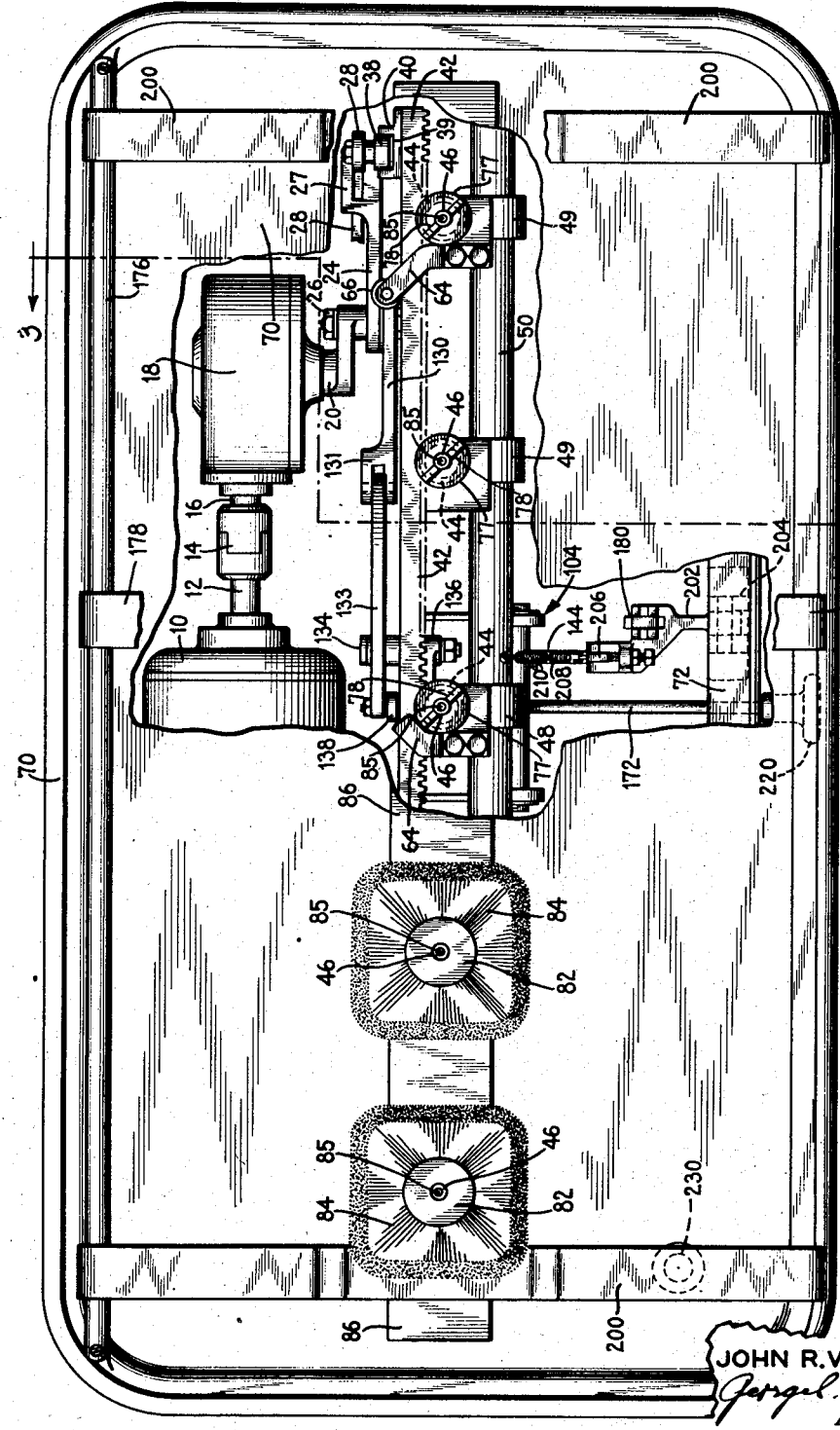
Fig. 2 is a plan view of the machine, a portion of the cover and the cover plate thereof being broken away to expose various operating parts.
Figure 3:
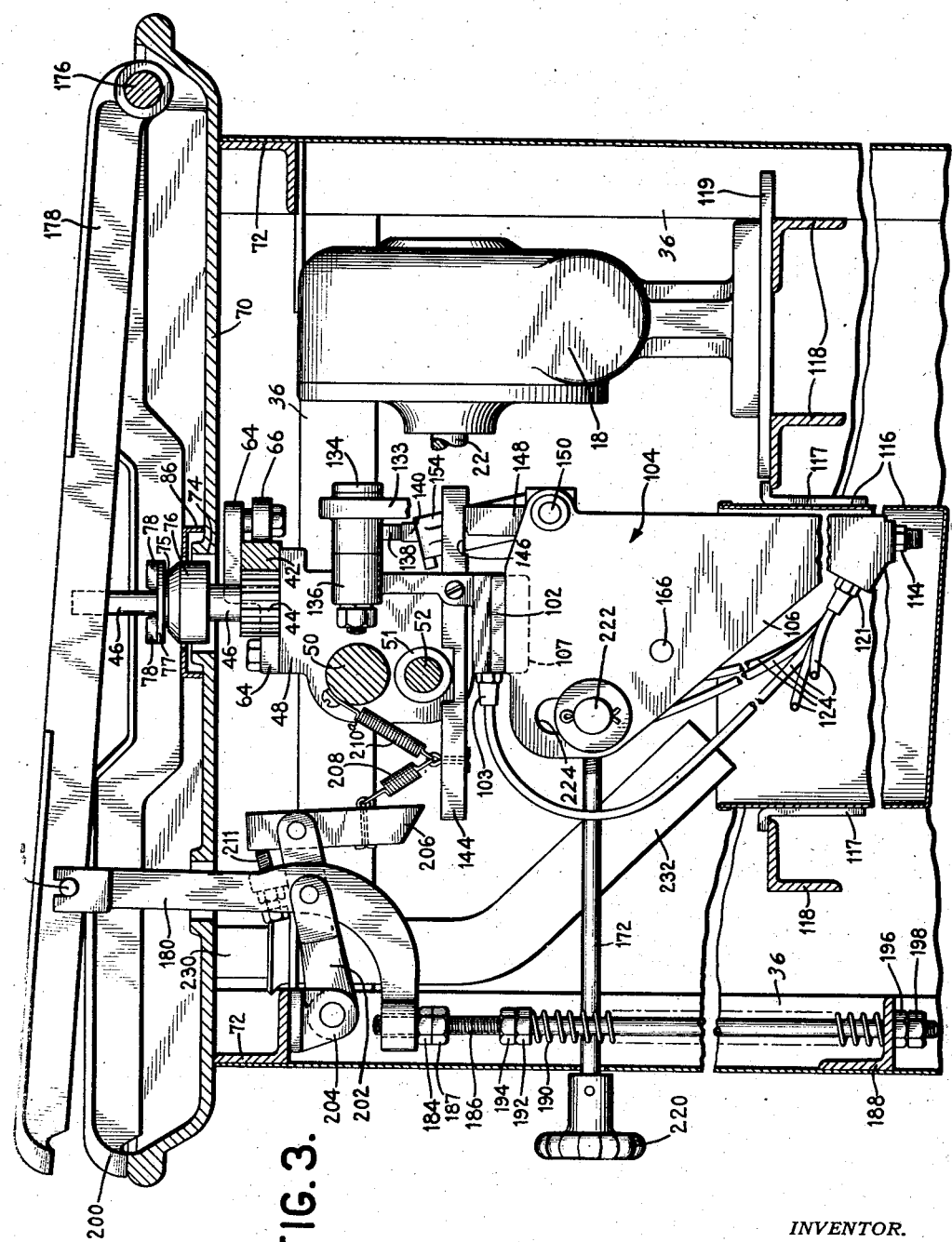
Fig. 3 is a cross-section on the line 3—3 of Fig. 2.

Referring to Figs. 1–3 of the drawings, the motor 10 has a shaft 12 which is connected by a coupling 14 with the drive shaft 16 of a worm gear reduction unit 18 of well-known construction, which drives a crank 20 fastened on the driven shaft 22 thereof. One end of a connecting rod 24 is attached by a crank pin 26 to crank 20, and on the other end of rod 24 is formed a yoke 27 in which is disposed a lever 28 pivotally connected thereto by a pin 30. Lever 28 is fulcrumed on a shaft 32 supported in the tie bars 34 which connect the end frames 36 of the machine. On the upper end of lever 28 is mounted a roller 38 which slidably engages in the yoke 39 of a yoke bracket 40 fastened on the back of a rack 42, and thereby reciprocates the latter. Rack 42 meshes with a series of pinions 44 fastened on the hollow brush spindles 46. The central spindle is rotatably supported in a stationary bearing bracket 48, and the other spindles are similarly mounted in adjustable bearing brackets 49. Each of the brackets 49 is loosely mounted on a bar 50 carried by the end frames 36, and bracket 48 is fixed on bar 50. Thus the reciprocation of rack 42 alternately revolves the spindles first in one direction and then in the opposite direction.

In the particular pan-greaser construction illustrated herein, five spindles are shown, and in the bearing bracket 48 supporting the central spindle 46 is rotatably mounted a sleeve 51 in which are fastened the unthreaded inner ends of two separate lead screws 52 whose outer ends are supported in the end frames 36. Adjoining the sleeve 51, the lead screws have oppositely threaded portions 56 of the same pitch which are fitted into and coact with internally threaded sleeves or bushings 58 fastened in the bearing bracket 49 adjoining the central bearing bracket, to simultaneously adjust these brackets equally in opposite directions when the lead screws are turned. The two outermost bearing brackets 49 have internally threaded bores which are threaded on oppositely threaded portions 60 of the lead screws, the threads of portions 60 having the same pitch to adjust the outermost bearing brackets equally in opposite directions when the lead screw is turned. The adjoining threaded portions of each lead screw are separated by unthreaded portions thereof, and each bushing 58 has an unthreaded bore 61 which admits the inner end of the threaded portions 60 when the bearing brackets 49 are adjusted to their extreme outward position shown in Fig. 1. It will be noted that the threaded portions 60 have a sufficiently greater pitch than the threaded portions 56 of the lead screws, that is a pitch twice as great, so that when the crank handle 62 fastened on the outer end of one of the lead screws is turned, an equidistant spacing of the various bearing brackets and the spindles supported therein will be maintained. The purpose of the described adjustment is to permit greasing of pans of different dimensions, it being customary to connect together a series of pans by connecting bars so that they are equidistantly spaced, wherefore the spacing of centers of the pans will vary with the dimensions thereof.

To each of the outermost bearing brackets 49 and the central bracket 48 is fastened an arm 64 which carries a roller 66 engaging the back of the rack 42 to guide the same as it slides to and fro on the bearing brackets whereon it is supported.

A cover 70 is supported on the angle bars 72 connecting the end frames 36 and is provided with a longitudinal slot 74 through which the spindles 46 project upwardly. Collars 75, on which are rotatably mounted the sleeves 76 which revolve on roller bearings (not shown), are fastened on the portions of the spindles projecting into slot 74. The collars 75 have circumferential flanges 77 on their upper ends, which are provided with diametrically extending driving lugs or ribs 78 formed on their top faces. These ribs 78 are adapted to engage with transverse slots 80 in the bases of the brush heads 82 and thereby drive the latter. The construction of the brush heads and the attachment of the bristles 84 thereto is similar to that shown in the patent to W. F. Dehuff, No. 1,899,316, issued Feb. 28, 1933, wherefore further description thereof is deemed unnecessary, but it may be noted that each of the brush heads has a vertical bore 85 whose lower end admits the upper end of the spindle whereon it is supported and a metal tube (not shown) secured in the upper end of the bore and projecting downwardly into the interior of the brush spindles. The details of construction just mentioned are similar to those shown in the Dehuff patent.

Before mounting the brush heads with their slots 80 in driving engagement with the driving lugs 78, a cover plate 86 having spaced holes corresponding to the spacing of the spindles is placed upon cover 70 with the sleeves 76 disposed in said holes. It may be noted that a set of cover plates 86 is provided having various spacings in its holes corresponding to various adjusted positions of the spindles.

Each of the outermost and intermediate spindles 46 is mounted in a vertical bore (not shown, provided in its respective bracket 49, these bores in the outermost brackets 49 communicating through a nipple 94 threaded into the outer sides of these brackets with tubes or conduits 124. In each of the intermediate brackets 49, these vertical bores communicate through nipples 98 threaded into the bottoms of the brackets with tubes 124. The central bracket 48 is provided with a vertical bore (not shown) which communicates with a horizontal bore (not shown) formed in the base 102 of bracket 48 and communicating through a nipple 103 threaded into the outer end of said bore with one of the tubes 124.

Figure 4:
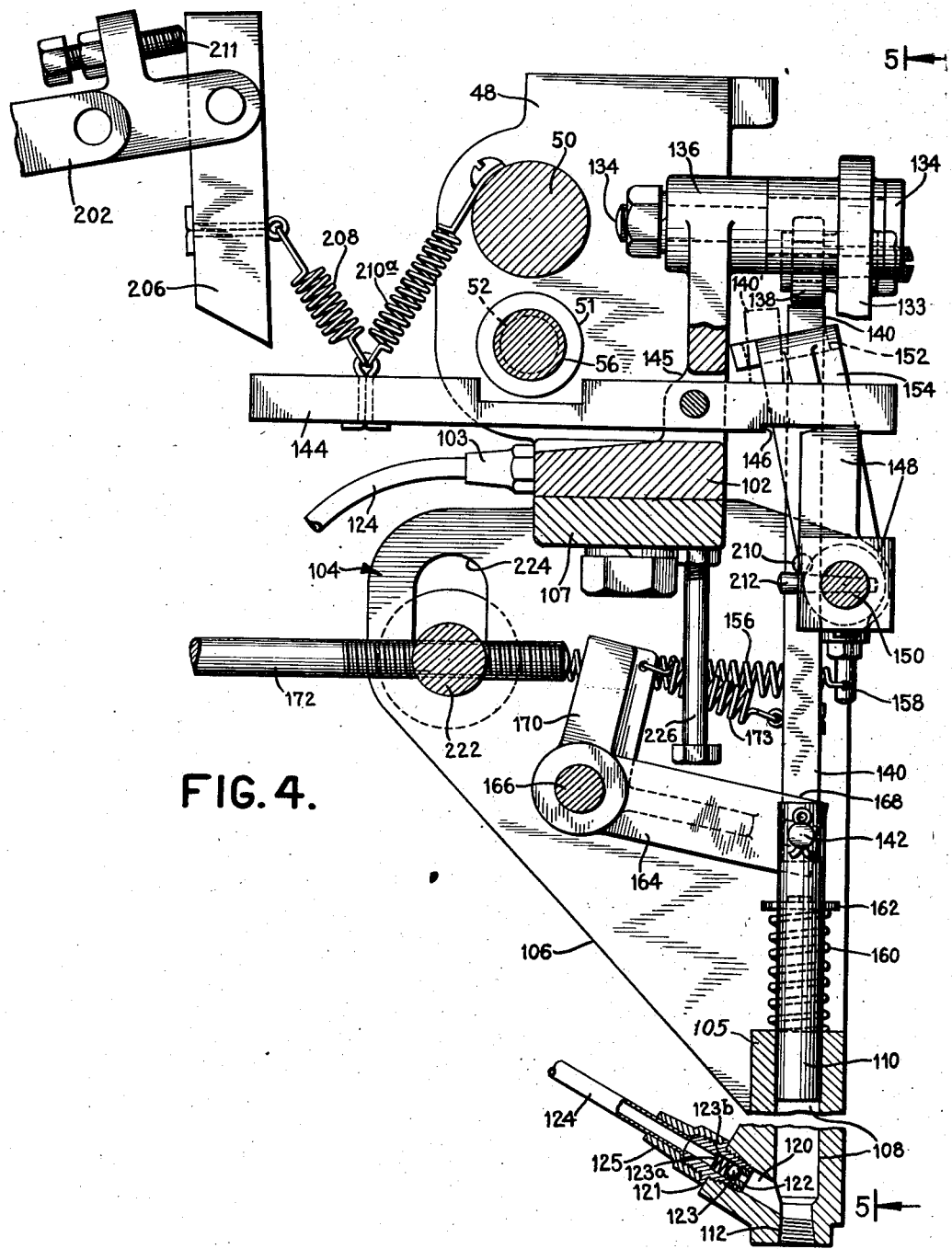
Fig. 4 is a detail sectional view on an enlarged scale on the line 4—4 of Fig. 1 of the mechanism controlling the operation of the pump.

The pump casting 104 has a base 105 from which a pair of frames 106 extend upwardly and are connected by an integral cross bar 107. The base 105 is provided with a series of cylindrical bores 108 in which are mounted the pistons 110. The intake ducts 112 formed in the bottom of the pump casting communicate with bores 108 and are provided with inlet check valves (Fig. 1) which have projecting nipples 114 immersed in the hot liquified grease contained in the sump 116 which is provided with straps 117 resting on the angle bars 118, connecting the end frames 36, whereby the sump may be removed through an opening in one of said frames. It may be noted that the bases of motor 10 and the reduction unit 18 are fastened to a platform 119, carried by bars 118. The outlet ducts 120 formed in the pump casting communicate with the bores 108, and into each of said ducts is threaded an outlet check valve. As shown in Fig. 4, each outlet check valve consists of a nipple 121 threaded into its outlet duct 120 and a sleeve 122 threaded into the inner end of the nipple and having a cupped seat against which a ball 123 is held by a compression spring 123a, seated against an internal shoulder 123b. The outlet check valves are connected by tubes 124 to the respective nipples 94, 98 and 103 of the bearing brackets. The tubes 124 are secured on the protruding ends of the nipples 121 by clamping rings 125 threaded on the nipples. The construction of the inlet check valves is similar except that the spring is seated against the sleeve corresponding to the sleeve 122 and holds the ball down against an internal shoulder corresponding to the shoulder 123b. When the pistons 110 ascend in their bores 108 they create suction in the latter and the balls of their inlet check valves are forced upwardly and the grease is sucked from sump 116 through the inlet check valves and intake ducts 112 into the bores 108. Then when the pistons 110 descend, the balls of the inlet check valves are closed and grease is forced through the outlet ducts 120 and past the balls 122 of the outlet check valves into the tubes 124 which deliver the grease to the spindles of the respective brackets, whereby it is delivered to the respective brush heads.

The operation of pistons 110 is controlled by mechanism which will now be described. A connecting rod 130 similar to rod 24 and pivotally mounted on the crank pin 26, has a yoke end 131 pivotally connected to a rocker arm 133 mounted on a stud 134 carried in a boss 136 formed on bracket 48. On the free end of the arm 133 is secured a roller 138.

Figure 5:
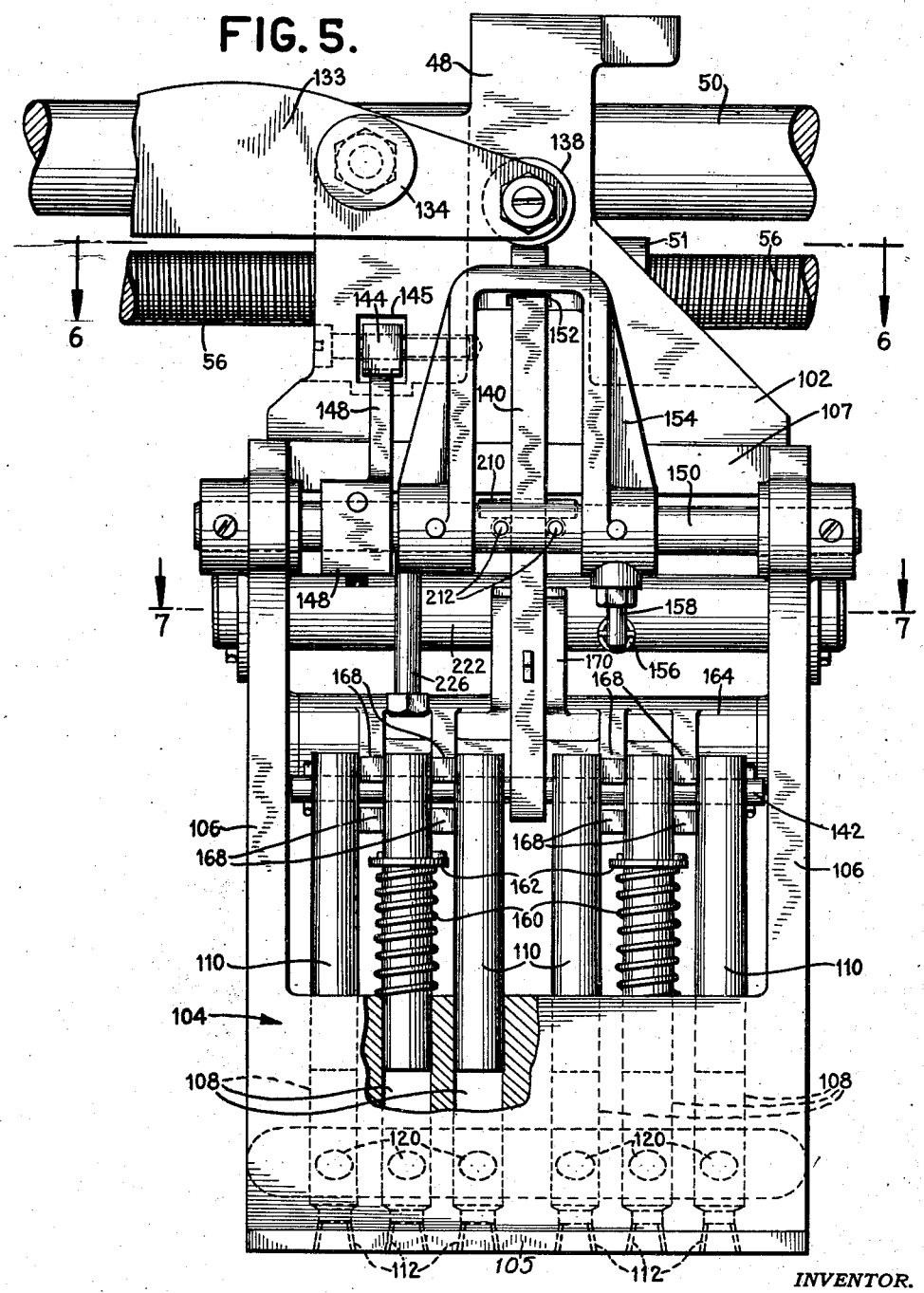
Fig. 5 is a detail side elevation of the same, viewed from line 5—5 of Fig. 4.
Figure 6:
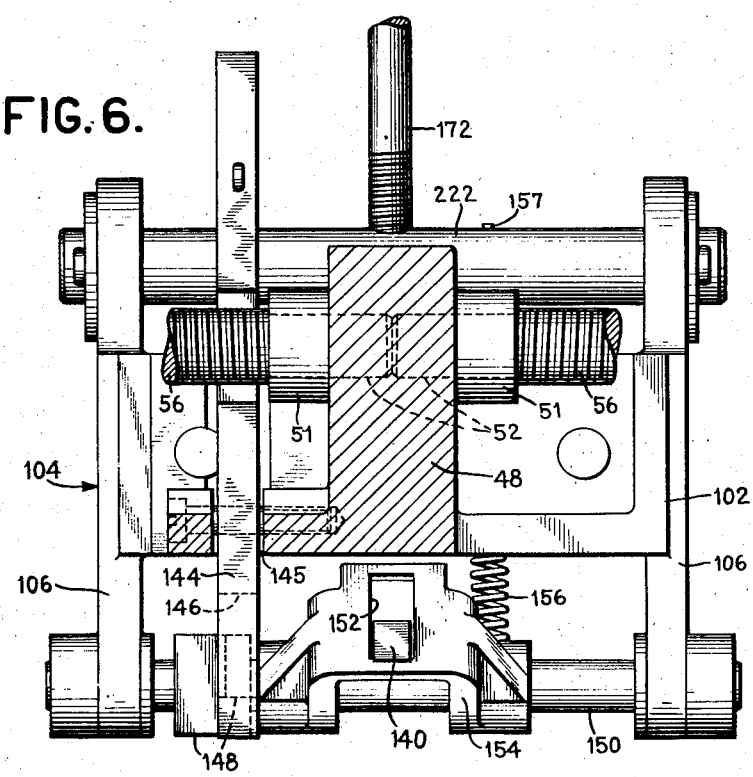
Fig. 6 is a cross-section on the line 6—6 of Fig. 5.
Figure 7:
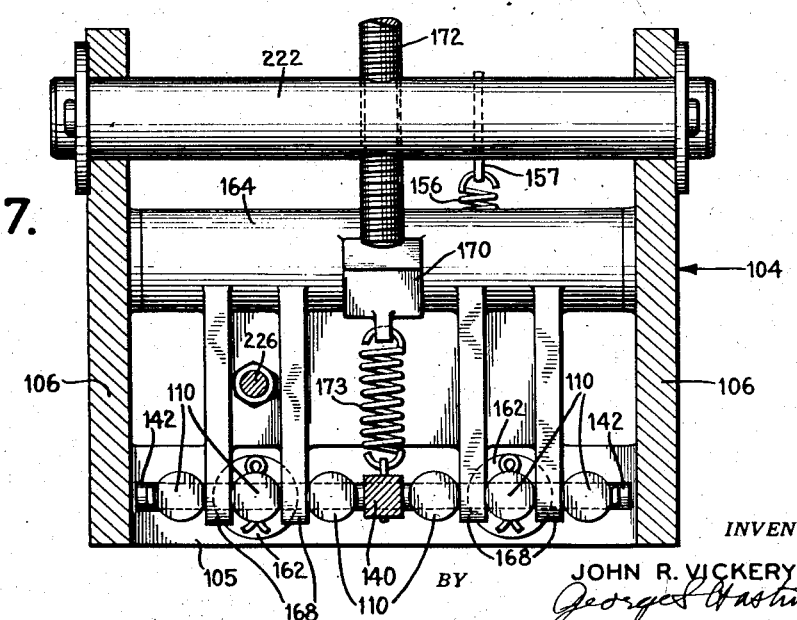
Fig. 7 is a cross-section on the line 7—7 of Fig. 5.

A push rod 140 which normally occupies the dotted position 140' indicated in Fig. 4, is pivotally mounted on a bar 142 passing through holes in the upper ends of the pistons 110 and thus connecting the same together. The latch 144, which projects through a hole 145 formed in bracket 48 and is pivotally mounted on a stud supported in hole 145, has a notch 146 engaging the upper end of a trip lever 148 fastened on a shaft 150 supported in the frames 106. The push rod 140 projects upwardly through a slot 152 formed in a yoke bracket 154 secured to shaft 150. A tension spring 156 which is secured at one end to a stud 158 projecting from the yoke bracket 154, as shown in Figs. 4 and 5, is suitably anchored at its other end to a cotter pin 157 secured in shaft 222 (Figs. 6 and 7), to urge the shaft 150 in a clockwise direction as viewed in Fig. 4, when latch 144 is released, so that the push rod will be displaced from the dotted position 140' shown to the full line position underlying the roller 138. A pair of compression springs 160, each mounted upon one of the pistons 110 and seated against collars 162 fastened thereon, urge the pistons upwardly. A yoke 164, mounted on a shaft 166 supported by the frames 106 of the pump casting has bifurcated ends 168 engaging the bar 142 connecting the pistons, and the arm 170 of said yoke is arranged to engage the adjustable stop screw 172 and thereby check the upward movement of the pistons.

The spring 173 connecting the arm 170 to rod 140 normally maintains the latter in its dotted position 140', but the spring 156 is sufficiently stronger than spring 173 to turn rod 140 into the position underlying roller 138 when latch 144 is disengaged from trip lever 148.

A bar 176, which has its ends fastened to the cover 70 as shown in Fig. 2, has loosely mounted thereon the lever 178 which is normally maintained in an upper position by an arm 180 (Figs. 2 and 3), having notches in its upper end which engage with a cross-pin 182 fastened in the lever 178. The lower end of arm 180 is supported on an adjusting nut 184 which is threaded on a rod 186 and provided with a locknut 187. Rod 186 is slidably mounted in the angle bar 188 and urged in an upward direction by a compression spring 190. The latter is seated against the angle bar 188, which connects the frames 36, and engages a nut 192 threaded on rod 186, the nut 192 being provided with a locknut 194. The upward movement of rod 186 is limited by a check nut 196 mounted on the lower end of the rod in position to engage the underside of the angle bar, and nut 196 may be provided with a locknut 198, if desired. In this manner the lever 178 is held in the desired upper position except when it is manually depressed to a position wherein it is aligned with the stationary bars 200, which have one end mounted on the bar 176 and their other end resting on cover 70, the arm 180 will be depressed and the yoke 202, which is pivoted on a bracket 204 secured to angle bar 72 and pivotally connected to the arm 180, will move the trip finger 206 downwardly. The trip finger 206 is pivotally mounted on the outer end of member 202 and connected by a tension spring 208 to the latch 144, the latter also being connected by the spring 210a to the bar 50. Thus the upper end of trip finger 206 is held against the adjustable stop screw 211 and the notched portion 146 of latch 144 is held in engagement with trip lever 148. During the descent of the arm 180, the trip finger 206 will engage the outer end of the latch 144 momentarily and thus lift its notched portion 146 from the trip lever 148, whereby the push rod 140 will be swung in a clockwise direction. If the roller 138 should be sufficiently elevated at this moment, the push rod will move directly under it, but if the roller should be in a lower position, the push rod will rest against the side of the roller until the same moves upwardly enough to permit the push rod to be moved under it. Then during the descent of the roller 138, the rod and the pistons are displaced downwardly to deliver grease to the various brush spindles, and the pin 210 on the push rod near the end of the downward stroke of the push rod, engages the pins 212 projecting from the shaft 150 and returns the trip lever 148 to the position shown in Fig. 4 and simultaneously returns push rod 140 to the dotted position shown in Fig. 4 wherein it is maintained by spring 173. The spring 210a maintains the latch 144 in position to re-engage and lock trip lever 148 in the position shown in Figs. 3 and 4.

By turning the knob 220 fastened on the outer end of the stop screw 172, it may be adjusted so that its inner end will check the movement of arm 170 sooner or later. Thus the amount of grease which will be sucked into the bores 108 during the upward movement of pistons 110 may be regulated. As shown in Fig. 1, the knob 220 is suitably marked with arrow heads "On," "Off," indicating directions in which the knob is to be turned to increase or decrease the amount of grease to be delivered.

When it is desired to prime the bores 108 in the pump casting, as when beginning to operate the machine, the knob 220 may be grasped and the screw 172 thereby lifted out of the path of the arm 170. It will be noted that screw 172 is threaded into a rod 222 which is supported in an elongated slot 224 formed in the frames 106 of the pump casting and when the rod 222 is lifted in the slot 224 by grasping knob 220, the screw will be displaced out of the path of the arm 170. Then the bores 108 in the pump casting may be primed by manipulating the lever 178, the upward movement of the yoke 164 being regulated in this case by checking it through engagement with the screw 226 threaded into the pump casting.

The cover 70 may be formed to slope toward a spout 230 formed in one corner thereof (Figs. 2 and 3) to deliver any grease which may drop from the brush heads, to a conduit 232 (Fig. 3) underlying the spout. The conduit extends to a position above the sump 116, so that the surplus grease will be returned to the latter.

It will be noted that the pump casting is provided with six cylinders or bores, each having a piston mounted therein and provided with inlet and outlet ducts, whereas only five spindles are shown. When the sixth spindle is to be added to the machine an additional supporting bracket is required.

What is claimed is:

1. In a pan-greaser, the combination with a series of rotary spindles, of a series of brush-heads mounted on said spindles, means adapted to deliver grease to said brush-heads, said grease delivering means including a continuously operating actuator, a pump comprising a cylinder and a piston mounted in said cylinder, and a member connected to said piston and adapted to be moved into the path of said actuator to displace said piston in its cylinder, latch means normally maintaining said member out of the path of said actuator, and a manually operable means for releasing said member from said latch means to permit said member to be moved into the path of said actuator.

2. In a pan-greaser, the combination with a series of hollow rotary spindles adapted to support a series of brush-heads, of means adapted to deliver grease through said spindles to said brush-heads, and manually controlled mechanism for initiating the operation of said means, said means including a continuously operating actuator, a pump comprising a cylinder and a piston mounted in said cylinder, and a member connected to said piston and adapted to be moved into the path of said actuator to displace said piston in its cylinder, and said mechanism including a pan-rest adapted to support a group of pans to be greased by said brush-heads and be manually depressed into a position wherein the pans supported thereon are positioned for greasing, latch means normally maintaining said member out of the path of said actuator, and means operated by the depression of said pan-rest for releasing said latch means from said member to permit the latter to be moved into the path of said actuator.

3. In a pan-greaser, the combination with a series of hollow rotary spindles adapted to support a series of brush-heads, of means adapted to deliver grease through said spindles to said brush-heads, and manually controlled mechanism for initiating the operation of said means, said means including a series of cylinders each having an inlet duct adapted to admit liquified grease into the cylinder from a source of supply, and each of said cylinders also being provided with an outlet duct, conduits connecting said outlet ducts to the interior of said spindles, a piston in each of said cylinders, a device urging said pistons outwardly in said cylinders to permit the latter to be filled with grease, a stop for limiting the outward movement of said pistons, and a device for moving the pistons inwardly to expel the grease through said outlet ducts and conduits into said spindles, for delivery to the brush-heads, a rocker arm, a roller mounted on said arm, a device for continuously oscillating said arm, a member pivotally connected to said pistons and adapted to be moved into the path of said roller to displace the pistons inwardly in said cylinders, and a spring urging said member into the path of said roller, and said mechanism including latch means normally maintaining said member out of the path of said roller, and manually operable device for releasing said member from said latch means to permit said spring to move said member into the path of said roller.

4. In a pan-greaser, the combination with a series of hollow rotary spindles adapted to support a series of brush-heads, of means adapted to deliver grease through said spindles to said brush-heads, and manually controlled mechanism for initiating the operation of said means, said means including a series of cylinders each having an inlet duct adapted to admit liquified grease into the cylinder from a source of supply, and each of said cylinders also being provided with an outlet duct, conduits connecting said outlet ducts to the interior of said spindles, a piston in each of said cylinders, a device urging said pistons outwardly in said cylinders to permit the latter to be filled with grease, a stationary stop normally disposed in a predetermined position for limiting the outward movement of said pistons, and a device for moving the pistons inwardly to expel the grease through said outlet ducts and conduits into said spindles, for delivery to the brush-heads, said stop being displaceable from its normal position wherein it limits the outward movement of said pistons, to permit priming of the cylinders.

5. Pan greasing machine including a plurality of rotatably mounted brushes, a grease pump, means for feeding grease from said pump to said brushes, power driven means adapted to operate said pump, pump operating means cooperable with said power-driven means but normally inoperatively related thereto, and pan weight responsive means for putting said pump operative means in operative relation to said power-driven means.

6. Pan greasing machine including a plurality of rotatably mounted brushes, a grease pump and means for feeding grease from said pump to said brushes, power-driven means adapted to operate said pump, pump operating means co-operable with said power-driven means but normally inoperatively related thereto, pan weight responsive means, and a connecting means between said pump operating means and said pan weight responsive means for putting said pump operating means in operative relation to said power-driven means when actuated by said pan weight responsive means, said connecting means operating to automatically release said pump operating means from said power driven means after one grease ejecting stroke of said operating means, irrespective of the position of said pan weight responsive means.

7. In a pan greaser, the combination with a series of rotary spindles adapted to support a series of brush-heads, of means adapted to deliver grease to said brush-heads, said means including a pump having a reciprocable piston, an actuator having a predetermined movement, mechanism connected to said piston and adapted to be moved into position to be engaged by said actuator for operating said pump piston, and a manual control means for displacing said mechanism into position to be engaged by said actuator and thereby operating said piston.

8. In a pan greaser, the combination with a series of rotary spindles adapted to support a series of brush-heads, of means adapted to deliver grease to said brush-heads, said means including a pump having a reciprocable piston, an actuator having a predetermined movement, mechanism connected to said piston and adapted to be moved into position to be engaged by said actuator for operating said pump piston, a manual control means for displacing said mechanism into position to be engaged by said actuator and thereby operating said piston, and means for disengaging said mechanism from said actuator.

9. In a pan greaser, the combination with a series of rotary spindles, of a series of brush-heads mounted on said spindles, means adapted to deliver grease to said brush heads, power driven means adapted to engage said grease delivering means for operating the latter to deliver grease to the brush heads, and manually controlled mechanism for engaging the power driven means with said grease delivering means, said grease delivering means including a device for automatically disengaging the grease delivering means from said power driven means to deliver a predetermined quantity of grease to said brush heads.

10. In a pan greaser, the combination with a series of hollow rotary spindles adapted to support a series of brush-heads, of means adapted to deliver grease through said spindles to said brush-heads, power driven means adapted to engage said grease delivering means for operating the latter to deliver grease to said brush-heads, and manually controlled mechanism for engaging said power-driven means with said grease delivering means, said grease delivering means including a device for automatically disengaging the grease-delivering means from said power-driven means to deliver a predetermined quantity of grease through said spindles to said brush heads.

11. In a pan greaser, the combination with a series of hollow rotary spindles adapted to support a series of brush-heads, of means adapted to deliver grease through said spindles to said brush-heads, power driven means adapted to engage said grease delivering means for operating the latter to deliver grease to said brush-heads, and manually controlled mechanism for engaging said power driven means with said grease delivering means, said grease delivering means including a device for automatically disengaging the grease-delivering means from said power driven means after a predetermined interval to deliver a predetermined quantity of grease through said spindles to said brush-heads, said mechanism including a yieldingly mounted pan rest adapted to be engaged and depressed by a group of pans arranged in position to be greased by said brush-heads, and means operated by depression of said pan rest for engaging said grease delivering means with said power driven means.

12. In a pan greaser, the combination with a series of rotary spindles, of a series of brush heads mounted on said spindles, means for delivering grease to said brush heads, said means including a series of cylinders, pistons arranged in each of said cylinders, each of said cylinders having an inlet duct adapted to admit liquefied grease into the cylinder from a source of supply and an outlet duct through which the grease may be expelled by the movement of its piston, a device urging said pistons outwardly in said cylinders, a stationary stop for limiting the outward movement of said pistons, and a device for moving the pistons inwardly in said cylinders to expel grease therefrom through said outlet ducts, said stop being displaceable from its normal position wherein it limits the outward movement of said pistons, to permit priming of the cylinders by the operator of said device.

13. A pan greasing machine comprising a series of rotatably mounted brushes, a grease pump, means for feeding grease from said pump to said brushes including a member connected to said pump and adapted to be displaced to operate said pump and power driven means for displacing said member to operate said pump, mechanism including a pan-rest responsive to the pressure of a pan positioned in greasing position relative to said brushes for engaging said member with said power-driven means, said mechanism also including means for automatically disengaging said power-driven means and said member after one stroke of said pump irrespective of the continued pressure of the pan on said pan-rest.

14. In a pan greaser, the combination with a series of rotary spindles, of a series of brush-heads mounted on said spindles, means adapted to deliver grease to said brush-heads, said means including a series of cylinders each having an inlet duct adapted to admit liquified grease into the cylinder from a source of supply, and an outlet duct through which the grease may be expelled by the movement of its piston, a piston in each of said cylinders, a device yieldingly urging said pistons outwardly in said cylinders to permit the latter to be filled with grease, an adjustable stationary stop for limiting the outward movement of said pistons whereby the cylinders may be filled with variable quantities of grease, a device for moving the pistons inwardly in said cylinders to the same predetermined positions irrespective of the adjustment of said stop, the device for moving said pistons inwardly including a pivot connected to said pistons, a member pivotally mounted on said pivot, a motor, a reciprocatory actuator driven from said motor and adapted to engage said member and displace said pistons inwardly to said predetermined positions in said cylinders, and instrumentalities for swinging said member upon said pivot out of engagement with said actuator when said pistons have been displaced inwardly in said cylinders to said predetermined positions.

15. In a pan-greaser, the combination with a series of hollow rotary spindles adapted to support a series of brush-heads, of a series of cylinders, each of said cylinders having an inlet duct adapted to admit liquified grease into the cylinder from a source of supply and an outlet duct through which the grease may be expelled, check valves in said inlet and outlet ducts, pistons in each of said cylinders, means for yieldingly urging said pistons outwardly in said cylinders to permit the latter to be filled with grease through the check valves in said inlet ducts, adjustable stop means for limiting the outward movement of said pistons whereby upon adjustment of said stop means said cylinders may be filled with different volumes of grease, power-driven mechanism for moving said pistons inwardly in said cylinders to the same predetermined position irrespective of the adjustment of said stop means, to expel the grease through the check valves in said outlet ducts, and means for conducting the grease from the check valves in said outlet ducts to the interior of said spindles.

JOHN R. VICKERY, Jr.